(12) United States Patent
Brockley et al.

(10) Patent No.: US 9,586,583 B2
(45) Date of Patent: *Mar. 7, 2017

(54) VEHICLE SPEED CONTROL SYSTEM

(71) Applicant: Jaguar Land Rover Limited, Whitley, Coventry, Warwickshire (GB)

(72) Inventors: Nick Brockley, Lichfield (GB); Andrew Fairgrieve, Rugby (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/776,462

(22) PCT Filed: Jan. 16, 2014

(86) PCT No.: PCT/EP2014/050773
§ 371 (c)(1),
(2) Date: Sep. 14, 2015

(87) PCT Pub. No.: WO2014/139703
PCT Pub. Date: Sep. 18, 2014

(65) Prior Publication Data
US 2016/0031442 A1    Feb. 4, 2016

(30) Foreign Application Priority Data

Mar. 14, 2013    (GB) .................................. 1304656.0

(51) Int. Cl.
*B60W 10/06* (2006.01)
*B60W 10/10* (2012.01)
(Continued)

(52) U.S. Cl.
CPC .......... *B60W 30/143* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 2005/0085976 A1* | 4/2005 | Reibold | B60W 10/02 701/51 |
| 2008/0115993 A1* | 5/2008 | Roudeau | B60W 10/06 180/179 |

(Continued)

FOREIGN PATENT DOCUMENTS

| DE | 102011005000 A1 | 9/2012 |
| EP | 0729859 | 9/1996 |

(Continued)

OTHER PUBLICATIONS

International Search Report for application No. PCT/EP2014/050773, dated Jun. 12, 2014, 6 pages.
(Continued)

*Primary Examiner* — Edwin A Young
(74) *Attorney, Agent, or Firm* — Reising Ethington P.C.

(57) ABSTRACT

A control system for a vehicle operable to implement a speed control function, the control system comprising: means for receiving a user input of a target speed at which the vehicle is intended to travel; target speed torque determining means for determining an instantaneous value of torque, target speed torque, that should be applied to one or more wheels of the vehicle by a powertrain in order to control the vehicle to travel at the target speed; and filter means operable to filter the value of target speed torque to generate a filtered torque value, the system being operable to command the powertrain to apply to the one or more wheels an amount of torque corresponding to the filtered torque value, wherein the system further comprises modifier means operable to receive the instantaneous value of target speed torque generated by the target speed torque determining means and to input to the (Continued)

filter means a value of torque that is less than the target speed torque in dependence on a current speed of the vehicle and the target speed of the vehicle.

14 Claims, 8 Drawing Sheets

(51) Int. Cl.
  *B60W 30/14* (2006.01)
  *B60W 50/06* (2006.01)
  *B60W 10/184* (2012.01)
  *B60W 50/00* (2006.01)

(52) U.S. Cl.
  CPC .......... *B60W 10/184* (2013.01); *B60W 50/06* (2013.01); *B60W 2050/0027* (2013.01); *B60W 2050/0056* (2013.01); *B60W 2540/10* (2013.01); *B60W 2710/0666* (2013.01); *B60W 2710/105* (2013.01)

(56) References Cited

U.S. PATENT DOCUMENTS

| | | | |
|---|---|---|---|
| 2009/0118880 A1 | 5/2009 | Heap et al. | |
| 2010/0286886 A1* | 11/2010 | O'Leary | B60W 10/06 701/93 |
| 2016/0039415 A1* | 2/2016 | Brockley | B60W 50/06 701/94 |

FOREIGN PATENT DOCUMENTS

| | | |
|---|---|---|
| EP | 22208901 A1 | 12/2008 |
| JP | 10164704 A | 6/1998 |
| JP | 2000166007 A | 6/2000 |

OTHER PUBLICATIONS

GB Combined Search and Examination Report for corresponding application No. GB1304656.0, dated Sep. 4, 2013, 5 pages.

* cited by examiner

VEHICLE SPEED CONTROL SYSTEM

FIELD OF THE INVENTION

The invention relates to a system for controlling the speed of a vehicle, in particular, but not exclusively, the invention relates to a system for controlling the speed of a land-based vehicle which is capable of driving in a variety of different and extreme terrains and conditions.

The content of co-pending UK patent application no GB1314727.7 is hereby incorporated by reference.

BACKGROUND TO THE INVENTION

In known vehicle speed control systems, typically referred to as cruise control systems, the vehicle speed is maintained on-road once set by the user without further intervention by the user so as to improve the driving experience for the user by reducing workload.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15-20 mph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when perking. Such systems are therefore ineffective in certain driving conditions (e.g. low speed) and are set to he automatically disabled in circumstances in which a user may not consider it to be desirable to do so.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller.

It is desirable to provide a speed control system capable of controlling vehicle speed at relatively low speeds and whilst driving in off road conditions.

STATEMENTS OF INVENTION

Embodiments of the invention may be understood with reference to the appended claims.

Aspects of the present invention provide a system, a vehicle and a method.

In one aspect of the invention for which protection is sought there is provided a control system for a vehicle operable to implement a speed control function, the control system comprising: means for receiving an input of a target speed at which the vehicle is intended to travel; target speed torque determining means for determining an instantaneous value of a target speed torque parameter corresponding to an amount of torque that should be developed at a given position in a powertrain in order to control the vehicle to travel at the target speed; modifier means operable to receive the instantaneous value of target speed torque parameter generated by the target speed torque determining means and to output to filter means a value of a filter torque parameter, the value of the filter torque parameter being determined in dependence on the value of the target speed torque parameter, a current speed of the vehicle and the target speed of the vehicle, the filter means being operable to filter the value of filter torque parameter to generate a value of a filtered torque parameter, the system being operable to command the powertrain to develop an amount of torque corresponding to the value of the filtered torque parameter.

By given position of the powertrain is meant any suitable position of the powertrain, such as an engine output shaft for a vehicle having an engine, a gearbox or transmission input shaft, output shaft, drive shaft, one or more road wheels or any other suitable location of the powertrain.

The modifier means may be implemented in software code, by means of a digital or analogue circuit or by any other suitable means.

The input of the target speed may correspond to a user input, for example by means of a human machine interface (HMI).

Advantageously the modifier means may be operable to output a value of filter torque parameter that is less than the value of target speed torque parameter by an amount depending on the difference between the current vehicle speed and the target speed.

Further advantageously the modifier means may be operable to output a value of filter torque parameter corresponding substantially to a minimum powertrain torque value if the current speed of the vehicle is greater than the target speed by more than a prescribed amount, the minimum powertrain torque value corresponding substantially to a minimum amount of torque the powertrain may develop at the given position.

The present inventors have recognised that, in the absence of the modifier means, a difference exists in responsiveness of a vehicle to changes in speed depending on whether speed control is active. This can result in a reduction of driver confidence in the speed control system.

Embodiments of the present invention have the advantage that a difference in a response of a vehicle to changes in powertrain torque demand in dependence on whether or not the control system is implementing the speed control function may be reduced. This feature has the advantage that driver confidence in the speed control function may be enhanced.

Embodiments of the present invention have the advantage that if a driver over-rides speed control by demanding torque exceeding the target speed torque value and increases vehicle speed sufficiently, for example by depressing an accelerator pedal or the like, when the driver subsequently stops over-riding speed control vehicle speed falls to the target speed more quickly.

For example, if a driver is travelling without speed control active at 10 kph and wishes to reduce vehicle speed to 5 kph, the driver might temporarily release an accelerator control such as an accelerator pedal and allow vehicle speed to fail to a value close to the target speed. The driver might then actuate the accelerator pedal to maintain the target speed. Engine braking might therefore be provided by the powertrain to slow the vehicle during the period in which the accelerator pedal is released by the driver.

In contrast, if speed control by the control system is active and the driver over-rides the speed control function by demanding more powertrain torque than that requested by the speed control function, for example in order to move more quickly past a particular location, and then releases the accelerator pedal and allows the control system to resume vehicle control, the amount of torque demanded by the speed control function whilst the vehicle decelerates may not fall towards a value corresponding to a released accelerator pedal position as quickly as in the case where speed control is not active, and may not fall to a value corresponding to a released accelerator pedal position at all in some situations. Accordingly the driver may perceive the vehicle speed to be 'floating', i.e. falling too slowly, and the vehicle relatively unresponsive to the release of the accelerator pedal by the driver.

Some embodiments of the present invention overcome this problem by modifying the value of filter torque parameter input to the filter means according to the difference between current vehicle speed and target speed. In one embodiment, if the current speed exceeds target speed by a sufficiently large amount a value of filter torque parameter corresponding substantially to a minimum available powertrain torque is input to the filter means. This feature effectively simulates release (at least temporarily) of, for example, an accelerator pedal by a driver in order to allow vehicle speed to fall towards the target speed.

The modifier means may be operable to output a value of filter torque parameter corresponding substantially to a minimum powertrain torque value if the current speed of the vehicle is greater than the target speed by more than a prescribed amount and in addition it is determined that a value of a driver-demanded torque parameter determined in response to a driver accelerator control input has fallen from a value corresponding to a torque value exceeding the target speed torque to a value corresponding substantially to a minimum amount of torque the powertrain may develop at the given position.

The minimum amount may correspond to a prescribed minimum amount of torque that the powertrain can provide under the prevailing conditions. The minimum torque may depend on a temperature of one or more components of the powertrain such as an engine temperature, an electric machine temperature, a gearbox temperature and one or more other components in addition or instead. The minimum amount corresponds substantially to the amount requested when speed control is not operating and a driver releases an accelerator control whilst the vehicle is moving.

Thus, in a vehicle having only an engine coupled to one or more wheels, the powertrain may develop negative torque by engine compression braking. The minimum powertrain torque in this case may correspond to the maximum amount of braking the powertrain can provide by means of engine braking, including powertrain losses due to factors such as friction and viscous drag.

Embodiments of the present invention are useful in a range of different types of vehicles including vehicles having a single engine such as a single internal combustion engine as the source of propulsion, in hybrid electric vehicles and in electric vehicles.

The modifier means may be operable to limit a value of torque parameter output thereby to a value corresponding to a lower saturation powertrain torque value.

The system may comprise means for generating a value of driver demanded torque in dependence on a position of a user operable accelerator control, the system being operable to apply to the filter means the higher of driver demanded torque value and the value of torque output by the modifier means.

The filter means may be configured such that the filtered torque value corresponds to a low pass filtered value of the filter torque parameter.

The input of the target speed may correspond to a user input, for example by means of a human machine interface (HMI).

In a further aspect of the invention for which protection is sought there is provided a vehicle comprising a control system according to a preceding aspect.

In a still further aspect of the invention for which protection is sought there is provided a method of controlling a speed of a vehicle comprising: receiving an input of a target speed at which the vehicle is intended to travel; determining an instantaneous value of a target speed torque parameter corresponding to an amount of torque that should be developed at a given position in a powertrain in order to control the vehicle to travel at the target speed; outputting to filter means a value of a filter torque parameter, the value of the filter torque parameter being determined in dependence on the value of the target speed torque parameter, a current speed of the vehicle and the target speed of the vehicle; filtering the value of filter torque parameter to generate a value of a filtered torque parameter; and commanding the powertrain to develop an amount of torque corresponding to the value of the filtered torque parameter.

Advantageously the method may comprise inputting to the filter means a value of filter torque parameter corresponding to a value of torque that is less than the value of target speed torque by an amount depending on the difference between the current vehicle speed and target speed.

According to another aspect of the invention, for which protection is sought, there is provided a carrier medium carrying computer readable code for controlling a vehicle to carry out the method as described hereinabove.

According to yet a further aspect of the invention, for which protection is sought, there is provided a computer program product executable on a processor so as to implement the method as described hereinabove.

The system described herein can comprise a control unit or computational device having one or more electronic processors. The system may comprise a single control unit or electronic controller or alternatively different functions of the control system may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

The method may comprise inputting to the filter means a value of filter torque corresponding substantially to a minimum powertrain torque value if the current speed of the vehicle is greater than the target speed by more than a prescribed amount, the minimum powertrain torque value corresponding substantially to a minimum amount of torque the powertrain may develop at the given position.

It is to be understood that in some embodiments the value of one or more of the various torque parameters referred to herein may be substantially equal to the value of torque represented by that parameter.

In one aspect of the invention for which protection is sought there is provided a control system for a vehicle operable to implement a speed control function, the control system comprising: means for receiving an input of a target speed at which the vehicle is intended to travel; target speed torque determining means for determining an instantaneous value of a target speed torque parameter corresponding to an amount of torque that should be developed at a given position in a powertrain in order to control the vehicle to travel at the target speed; modifier means operable to receive the instantaneous value of target speed torque parameter generated by the target speed torque determining means and to output to filter means a value of a filter torque parameter, the value of the filter torque parameter being determined in dependence on the value of the target speed torque parameter, a current speed of the vehicle and the target speed of the vehicle, the filter means being operable to filter the value of filter torque parameter to generate a value of a filtered torque parameter, the system being operable to command the powertrain to develop an amount of torque corresponding to the value of the filtered torque parameter.

The modifier means may he operable to output a value of filter torque parameter that is less than the value of target speed torque parameter by an amount depending on the difference between the current vehicle speed and target speed.

The modifier means may be operable to output a value of filter torque parameter corresponding substantially to a minimum powertrain torque value if the current speed of the vehicle is greater than the target speed by more than a prescribed amount, the minimum powertrain torque value corresponding substantially to a minimum amount of torque the powertrain may develop at the given position.

The modifier means may be operable to output a value of filter torque parameter corresponding substantially to a minimum powertrain torque value if the current speed of the vehicle is greater than the target speed by more than a prescribed amount and in addition a value of a driver-demanded torque parameter determined in response to a driver accelerator control input falls from a value corresponding to a torque value exceeding the target speed torque to a value corresponding substantially to a minimum amount of torque the powertrain may develop at the given position.

The modifier means may be operable to limit a lower value of torque parameter output thereby to a lower saturation torque parameter value.

The system may comprise means for generating a value of driver demanded torque parameter, the value depending on a position of a user operable accelerator control, the system being operable to apply to the filter means a selected one of the driver demanded torque parameter value and the filter torque parameter value, the selected parameter value being the value corresponding to the higher powertrain torque.

The filter means may be configured such that the filtered torque value corresponds to a low pass filtered value of the filter torque parameter.

In an aspect of the invention for which protection is sought there is provided a vehicle comprising the control system described in the preceding paragraphs.

In a further aspect of the invention for which protection is sought there is provided a method of controlling a speed of a vehicle comprising: receiving an input of a target speed at which the vehicle is intended to travel; determining an instantaneous value of a target speed torque parameter corresponding to an amount of torque that should be developed at a given position in a powertrain in order to control the vehicle to travel at the target speed; outputting to filter means a value of a filter torque parameter, the value of the filter torque parameter being determined in dependence on the value of the target speed torque parameter, a current speed of the vehicle and the target speed of the vehicle; filtering the value of filler torque parameter to generate a value of a tittered torque parameter; and commanding the powertrain to develop an amount of torque corresponding to the value of the filtered torque parameter.

The method may comprise inputting to the filter means a value of filter torque parameter corresponding to a value of torque that is less than the value of target speed torque by an amount depending on the difference between the current vehicle speed and target speed.

The method may comprise inputting to the filter means a value of filter torque corresponding substantially to a minimum powertrain torque value if the current speed of the vehicle is greater than the target speed by mere than a prescribed amount, the minimum powertrain torque value corresponding substantially to a minimum amount of torque the powertrain may develop at the given position.

It is to be understood that the target speed may also he referred to as a 'set-speed' and the terms 'target speed' and 'set-speed' are used interchangeably herein.

It will be appreciated that preferred and/or optional features of any one aspect of the invention may be incorporated alone or in appropriate combination within the any other aspect of the invention also.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

Figure 1:
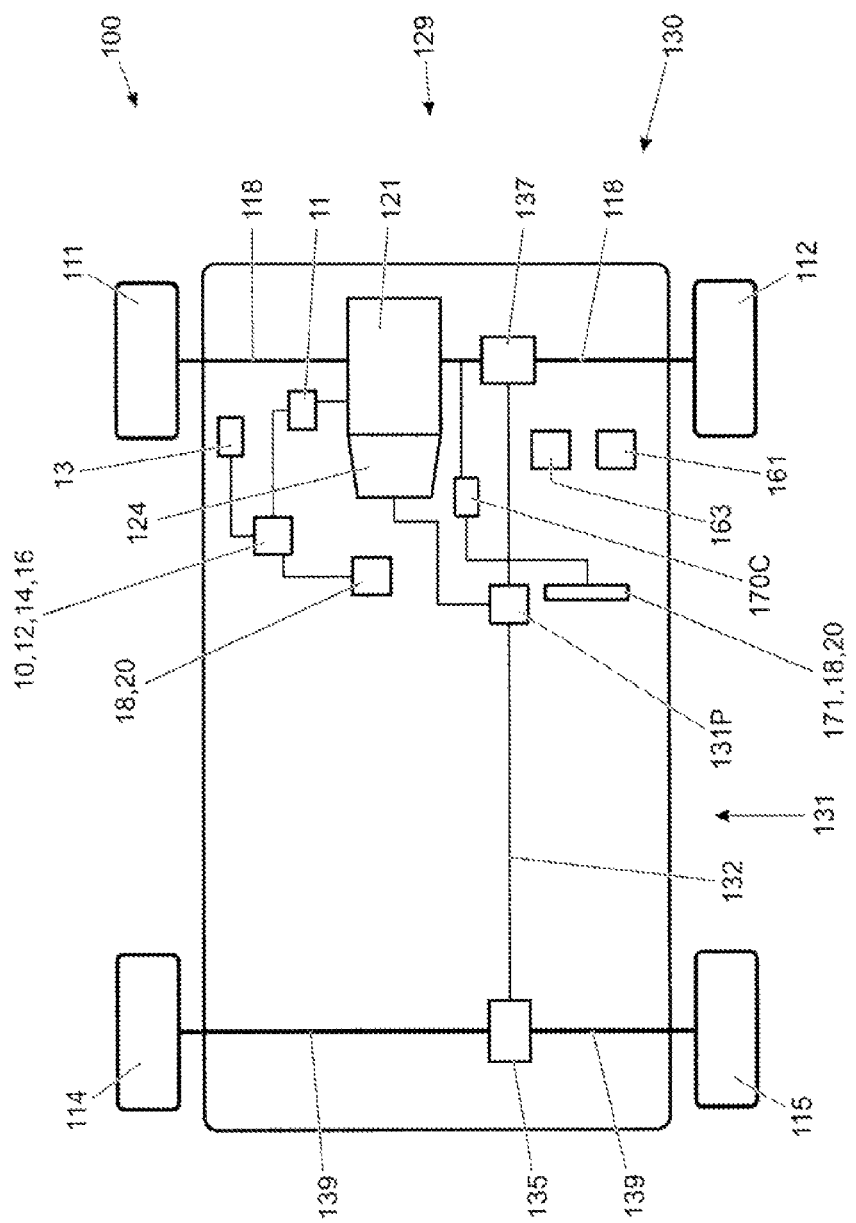
FIG. 1 is a schematic illustration of a vehicle according to an embodiment of the invention in plan view.
Figure 2:
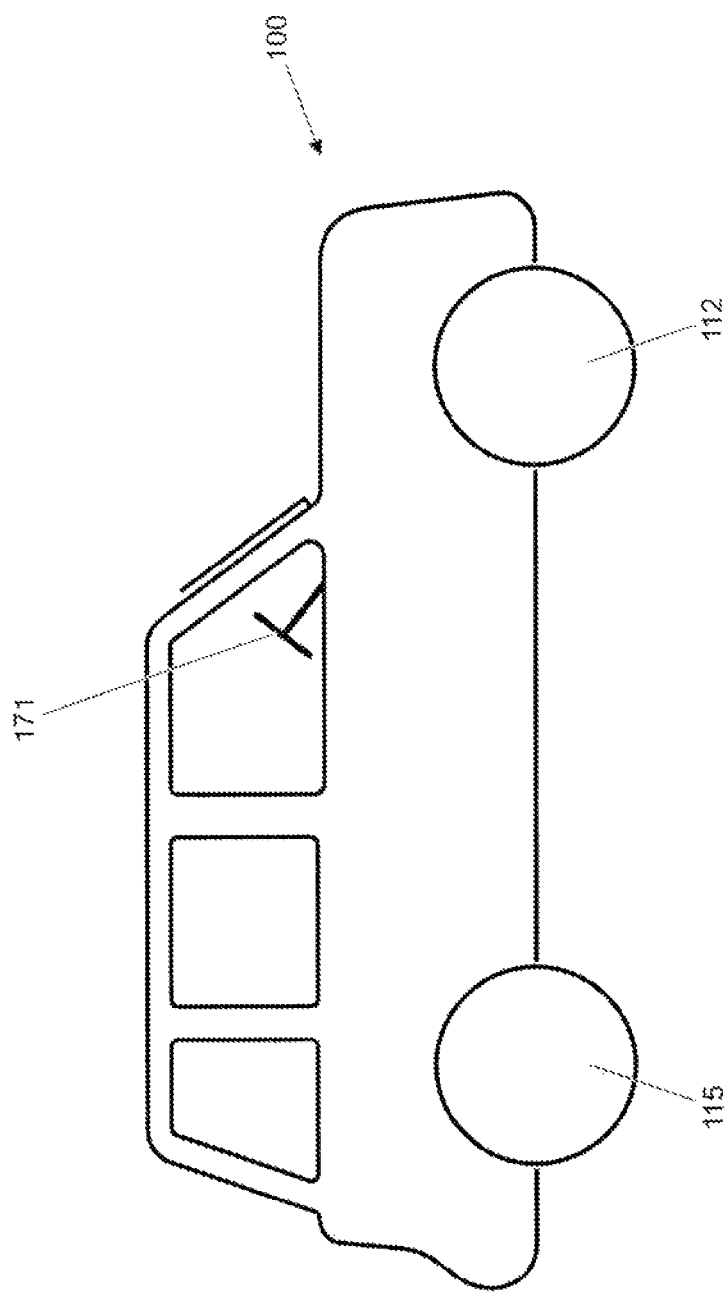
FIG. 2 shows the vehicle of FIG. 1 in side view.

FIG. 1 shows a vehicle 100 according to an embodiment of the invention having a powertrain 129. The powertrain 129 includes an engine 121 that is connected to a driveline 130 having an automatic transmission 124. Embodiments of the present invention are suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
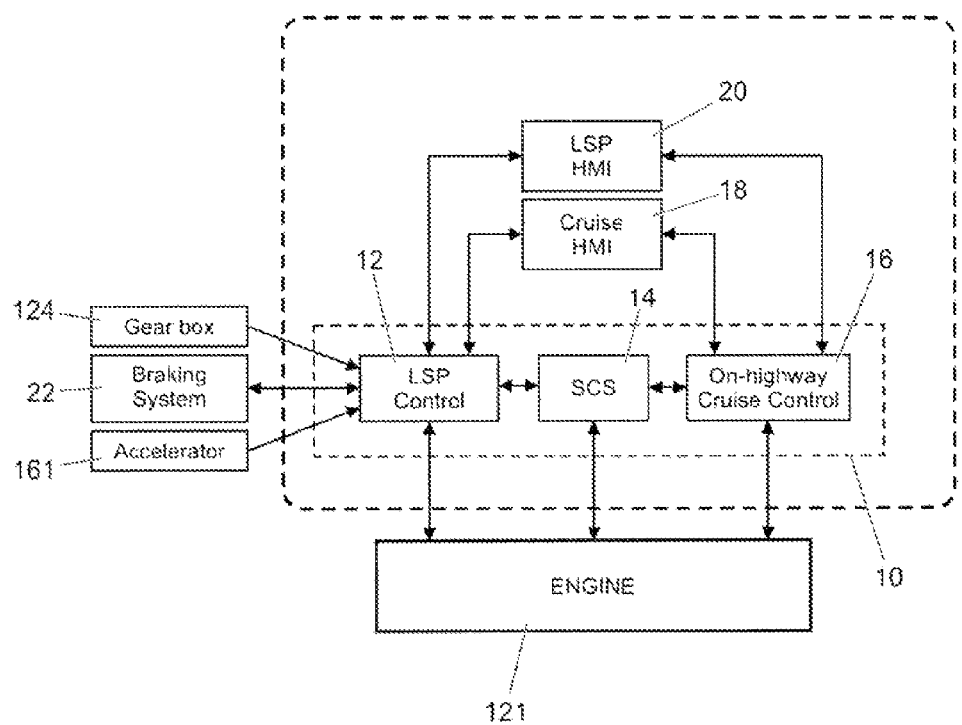
FIG. 3 is a high level schematic diagram of an embodiment of the vehicle speed control system of the present invention, including a cruise control system and a low-speed progress control system.

A control system for the vehicle engine 121 includes a central controller, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14, the latter being a known component of existing vehicle control systems. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative -embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity. TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 6:
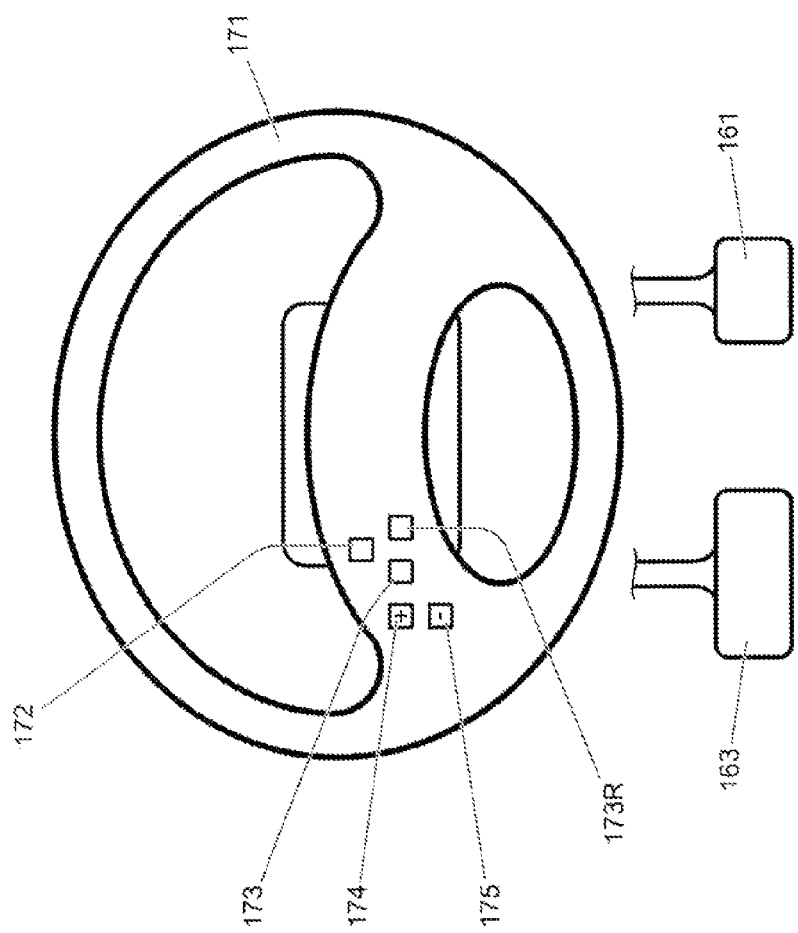
FIG. 6 illustrates a steering wheel and brake and accelerator pedals of a vehicle according to an embodiment of the present invention.

The vehicle 100 also includes a cruise control system 16 which is operable to automatically maintain vehicle speed at a selected speed when the vehicle is travelling at speeds in excess of 30 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 6). Depression of a 'set-speed' control 173 sets the set-speed to the current vehicle speed. Depression of a "+" button 174 allows the set-speed to be increased whilst depression of a "−" button 175 allows the set-speed to be decreased. In some embodiments, if the cruise control system 16 is not active when the "+" button 174 is depressed, the cruise control system 16 is activated.

The cruise control system 16 monitors vehicle speed and any deviation from the target vehicle speed is adjusted automatically so that the vehicle speed is maintained at a substantially constant value, typically in excess of 30 kph. In other words, the cruise control system is ineffective at speeds lower than 30 kph. The cruise control HMI 18 may also be configured to provide an alert to the user about the status of the cruise control system 16 via a visual display of the HMI 18.

The LSP control system 12 provides a speed-based control system for the user which enables the user to select a very low target speed at which the vehicle can progress without any pedal inputs being required by the user. This low-speed progress control function is not provided by the on-highway cruise control system 16 which operates only at speeds above 30 kph. Furthermore, known on highway cruise control systems including the present system 16 are configured so that, in the event that the user depresses the brake or the clutch, the cruise control function is cancelled and the vehicle 100 reverts to a manual mode of operation which requires user pedal input to maintain vehicle speed. In addition, detection of a wheel slip event, as may be initiated by a loss of traction, also has the effect of cancelling the cruise control function.

The LSP control system 12 is operable to apply selective powertrain, traction control and braking actions to the wheels of the vehicle, collectively or individually, to maintain the vehicle 100 at the desired speed. It is to be understood that if the vehicle 100 is operating in a two wheel drive mode in which only front wheels 111, 112 are driven, the control system 12 may be prevented from applying drive torque to rear wheels 113, 114 of the vehicle 100.

The user inputs the desired target speed to the LSP control system 12 via a low-speed progress control HMI (LSP HMI) 20 (FIG. 1, FIG. 3). The LSP control system 12 operates at vehicle speeds typically below about 50 kph but does not activate until vehicle speed drops to below 30 kph when the cruise control system of the vehicle becomes ineffective. The LSP control system 12 is configured to operate independently of a traction event, i.e. the system 12 does not cancel speed control upon detection of wheel slip. Rather, the LSP control system 12 actively manages vehicle behaviour and in this way, at least, differs from the functionality of the cruise control system 16, as will be described in further detail below.

The LSP control HMI 20 is provided in the vehicle cabin so as to be readily accessible to the user. The user of the vehicle is able to input to the LSP control system 12, via the LSP HMI 20, an indication of the speed at which the user desires the vehicle to travel (referred to as "the target speed"). The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of a brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20 which is representative of the status of the LSP control function.

The cruise control HMI 18 and the LSP HMI 20 have input controls provided on a steering wheel of the vehicle for convenience of operation by the user.

FIG. 6 shows the steering wheel 171 of the vehicle 100 of FIG. 1 in more detail, together with the accelerator and brake pedals 161, 163. As noted above, the steering wheel 171 bears user operable input controls of the cruise control HMI 18 and LSP control HMI 20. As in the case of a conventional vehicle, the steering wheel 171 has a 'set-speed' control 173, actuation of which enables a user to activate the cruise control system 16 to maintain the current vehicle speed. The wheel 171 also has a 'LSP' control activation button 172 for activating the LSP control system 12 and a resume button 173R. The resume button 173R may be used to control both the 'on-highway' cruise control system 16 when driving on road, and the LSP control system 12 when driving off-road, to resume a previously set (user defined) set-speed.

If the vehicle is operating on-highway, depression of set-speed control 173 causes the cruise control system 16 to activate provided the current vehicle speed is within the operating range of the cruise control system 16. Depression of the "+" control 174 causes the cruise control system 16 to increase the set-speed whilst depression of the "−" control 175 causes the cruise control system 16 to decrease the set-speed. It will be appreciated that "+" and "−" controls may be on a single button in some arrangements, such as a rocker-type button. In some embodiment, the "+" control 174 may function as a 'set-speed' control, in which case set-speed control 173 may be eliminated.

If the vehicle is operating off-highway, depression of set-speed control 173 causes the LSP control system 12 to activate and operate as described above, provided vehicle speed is within the operating range of the LSP control system 12.

In some embodiments, the system may further comprise a 'cancel' button operable to cancel speed control by the LSP control system 12. In some embodiments, the LSP system may be in either one of an active condition or a standby condition. In the present embodiment the LSP control system 12 is also operable to assume an intermediate condition in which vehicle speed control by the LSP control system 12 is suspended but a hill descent control (HDC) system or live like may remain active if already active. Other arrangements are also useful.

With the LSP control system 12 active, the user may increase or decrease the vehicle set-speed by means of the "+" and "−" buttons 174, 175. In addition, the user may also increase or decrease the vehicle set-speed by lightly pressing the accelerator or brake pedals 161, 163 respectively. In some embodiments, with the LSP control system 12 active the "+" and "−" buttons 174, 175 are disabled. This latter feature may prevent changes in set-speed by accidental pressing of one of these buttons, for example when negotiating difficult terrain where relatively large and frequent changes in steering angle may be required. Other arrangements are also useful.

Figure 4:
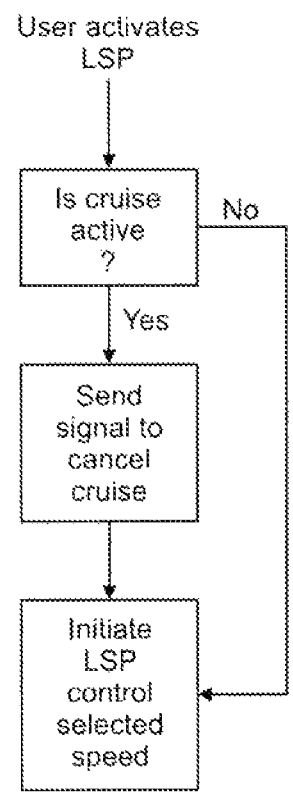
FIG. 4 is a flow diagram to illustrate the interaction between the cruise control system and the low-speed progress control system in FIG. 3.

FIG. 4 shows a flow process to illustrate the interaction between the cruise control system 18 and the LSP control system 12. If cruise control is active when the user tries to activate the LSP control system 12 via the LSP control HMI 20, a signal is sent to the cruise control system 16 to cancel the speed control routine. The LSP control system 12 is then initiated and the vehicle speed is maintained at the target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle is travelling.

In some embodiments, the cruise control system 16 may hand over vehicle speed control to the LSP control system 12 if a user reduces set-speed of the vehicle 100 to a value within the operating speed range of the LSP control system 12. Similarly, in some embodiments the LSP control system 16 may hand over vehicle speed control to the cruise control system 16 if a user raises vehicle set-speed to a value that is within the operating range of the cruise control system 16. Other arrangements are also useful.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 5:
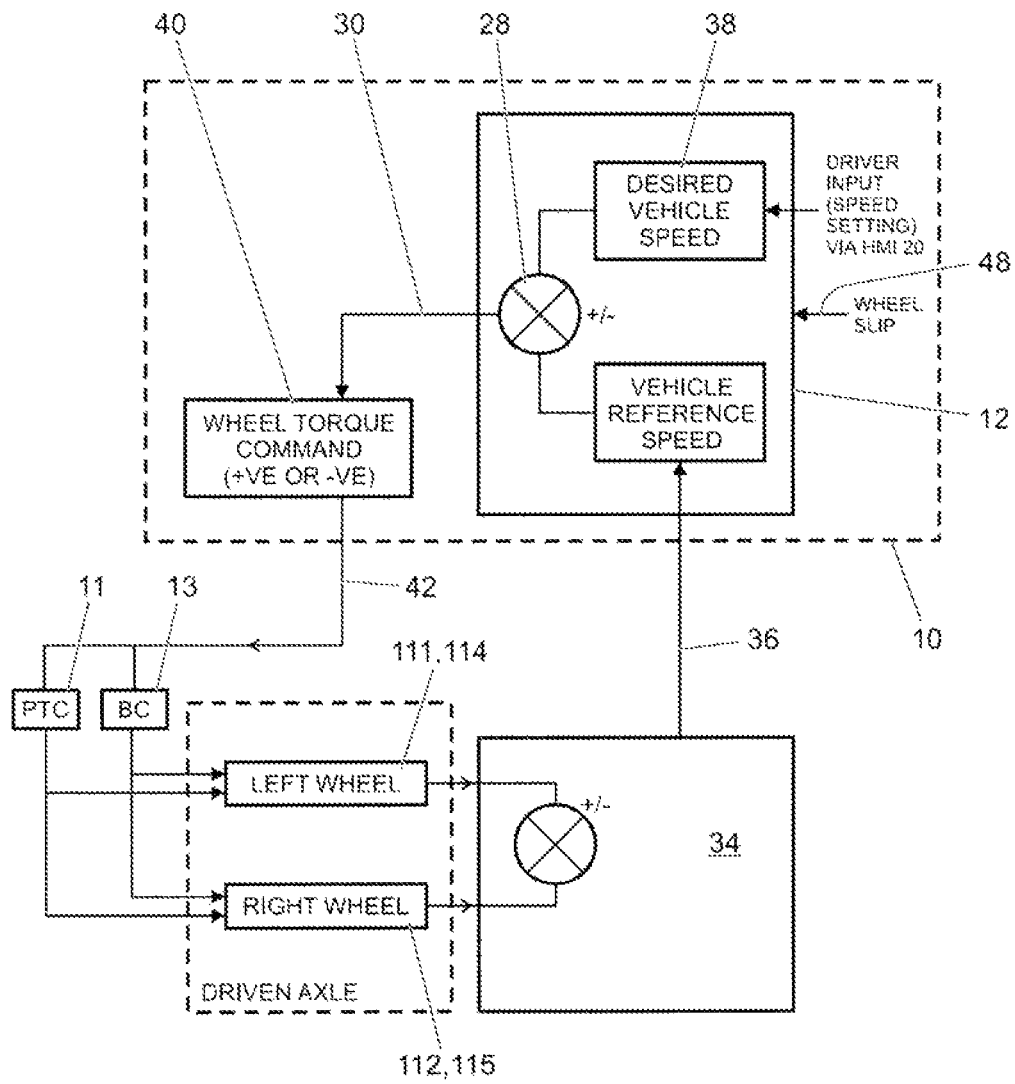
FIG. 5 is a schematic diagram of further features of the vehicle speed control system in FIG. 3.

FIG. 5 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 128 (shown in FIG. 1) provides a signal 36 indicative of vehicle speed to the LSP control system 12. The LSP control system 12 includes a comparator 28 which compares the set-speed (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed that has been selected by the user. An increase in torque is generally accomplished by increasing the amount of powertrain torque delivered to a wheel. A decrease in torque to a value that is less positive or more negative may be accomplished by decreasing powertrain torque delivered to a wheel and/or by increasing a braking force on a wheel. It is to be understood that in some embodiments in which a powertrain 120 has an electric machine operable as a generator, negative torque may be applied by the powertrain 129 to one or more wheels. It is to be understood that a brake controller 13 may nevertheless be involved in determining whether brake torque is required to be provided by an electric machine of a powertrain 129, and whether brake torque should be provided by an electric machine or a friction-based foundation braking system 22.

An output 42 from the evaluator unit 40 is provided to the powertrain controller 11 and brake controller 13 which in turn control a net torque applied to the vehicle wheels 111-115. The net torque may be increased or decreased depending on whether there is a positive or negative demand for torque from the evaluator unit 40. Thus, in order to initiate application of the necessary positive or negative torque to the wheels, the evaluator unit 40 may command that additional power is applied to the vehicle wheels and/or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines. In some embodiments, the one or more electric machines may be operable as either a propulsion motor or a generator under the control of the powertrain controller 11. Thus the powertrain controller 11 may in some embodiments be controlled to apply more positive or more negative torque to one or more wheels by means of an electric machine.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-high way cruise control system 16 so that automatic control of the vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the desired vehicle speed as input by the user, and continues to control automatically the torque applied across the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or the cruise control function reset.

A further embodiment of the invention (not shown) is one in which the vehicle is provided with a wheel slip signal 48 derived not just from a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 5, this may be implemented by providing a wheel slip event signal 48 to the LSP control system 12 which is then managed by the LSP control system 12. In the embodiment shown in FIG. 1 the SCS 14 generates the wheel slip event signal 48 and provides it to the LSP control system 12 and cruise control system 16.

A wheel slip event is triggered when a loss of fraction occurs at any one of the vehicle wheels. Wheels and tyres may be more prone to losing traction when travelling on snow, ice or sand and/or on steep gradients or cross-slopes, for example, or in environments where the terrain is more uneven or slippery compared with driving on a highway in normal on-road conditions. Embodiments of the present invention therefore find particular benefit when the vehicle is being driven in an off-road environment, or in conditions in which wheel slip may commonly occur. Manual operation by the user in such conditions can be a difficult and often stressful experience and may result in en uncomfortable ride. Embodiments of the present invention enable continued progress to be made at a relatively low target speed without the need for user intervention.

The vehicle 100 is also provided with additional sensors (not shown) which are representative of a variety of different parameters associated with vehicle motion and status. These may be inertial systems unique to the speed control system or part of an occupant restraint system or any other subsystem which may provide data from sensors such as gyros and/or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is travelling. The signals are provided to the VCU 10 which determines the most appropriate control mode for the various subsystems on the basis of the terrain indicators, and automatically controls the subsystems accordingly. This aspect of the invention is described in further detail in our co-pending published patent application nos. GB2492748, GB2492655 and GB2499279, the contents of each of which is incorporated herein by reference.

The sensors (not shown) on the vehicle include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be pad of the stability control system (SCS), a brake pedal position sensor, a brake pressure sensor, an accelerator pedal position sensor, longitudinal, lateral and vertical motion sensors, and wafer detection sensors forming part of a vehicle wading assistance system (not shown). In other embodiments, only a selection of the aforementioned sensors may be used.

The VCU 10 also receives a signal from the steering controller 170C. The steering controller is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the controller 170C.

The VCU 10 evaluates the various sensor inputs to determine the probability that each of a plurality of different control modes for the vehicle subsystems is appropriate, with each control mode corresponding to a particular terrain type over which the vehicle is travelling (for example, mud and ruts, sand, grass/gravel/snow). The VCU 10 then selects which of the control modes is most appropriate and controls various vehicle parameters accordingly.

The nature of the terrain over which the vehicle is travelling (as determined by reference to the selected control mode) may also be utilised in the LSP control system 12 to determine an appropriate increase or decrease in drive torque to be applied to the vehicle wheels. For example, if the user selects a target speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the ease of uneven or rough surfaces. If the system 12 selects a set-speed that differs from the user-selected set-speed (i.e. target speed), a visual indication of the speed constraint is provided to the user via the LSP HMI 20 to indicate that an alternative speed has been adopted.

As described above, the LSP control system 12 is operable to command a required amount of torque to be applied to one or more driven wheels of the vehicle 100 in order to cause the vehicle to travel at the user-selected set-speed. If whilst the LSP control system 12 is active the driver depresses the accelerator pedal 161 to demand additional powertrain torque above the amount currently demanded by the LSP control system 12, driver torque demand takes priority and the powertrain 129 is controlled so as to meet driver demand. In the present embodiment, if driver demand exceeds that demanded by the LSP control system 12, the LSP control system 12 remains active, i.e. the LSP control system 12 continues to calculate an amount of powertrain torque and brake torque that the powertrain controller 11 and brake controller 13 should command be applied to the driven wheels of the vehicle 100 in order to travel at the set-speed. In this way, once a driver releases the accelerator pedal 161, the LSP control system 12 resumes control of vehicle speed.

It is to be understood that the LSP control system 12 may command the required amount of torque by generating a value of a torque parameter. The powertrain controller 11 may be configured to develop the required amount of torque depending on the value of this torque parameter, which may have a value that corresponds to the required amount of torque without necessarily being equal to the amount of required torque. Thus, for-example, the LSP control system 12 may generate a code, such as a number such as 10020, which may correspond to a required powertrain torque of 150 Nm, different codes being generated for different required amounts of powertrain torque. In response to receipt of a command to generate powertrain torque at a level of (say) 10020, the powertrain controller 11 may therefore control the powertrain 11 to generate 150 Nm of torque. Other arrangements are also useful.

As described above, the LSP control system 12 may command the powertrain 129 to develop a required amount of torque at a given location, such as at an output shaft of the engine 121, at an input shaft of the transmission 124, an output shaft of the transmission 124, a wheel or any other suitable location. It is to be understood that if the LSP control system 12 is arranged to control the powertrain 129 to apply a given amount of torque at a location other than a wheel, such as an output shaft of the engine 121, the torque delivered at a wheel may be calculated based on a gear ratio between the engine output shaft and wheel. The control system 12 may be operable to command the powertrain 129 to establish a given gear ratio between a given position of the powertrain 129 and wheel, so as to establish a desired torque at the wheel. Thus, whilst the LSP control system 12 commands the powertrain to generate a given amount of torque at a given position (and may command the generation of given amounts of torque at a plurality of locations, particularly in a powertrain 129 having a plurality of motors such as an engine and an electric propulsion motor), the LSP control system 12 may also be operable to ensure that the torque delivered to a wheel is a required value by suitable control of the gear ratio. Other arrangements are also useful. In some embodiments, the LSP control system 12 may be provided with data corresponding to a gear ratio between a given position of the powertrain 120 and one or more wheels, and command application of an amount of torque to the given position of the powertrain 129 so as to obtain a required amount of torque at the one or more wheels.

Figure 7:
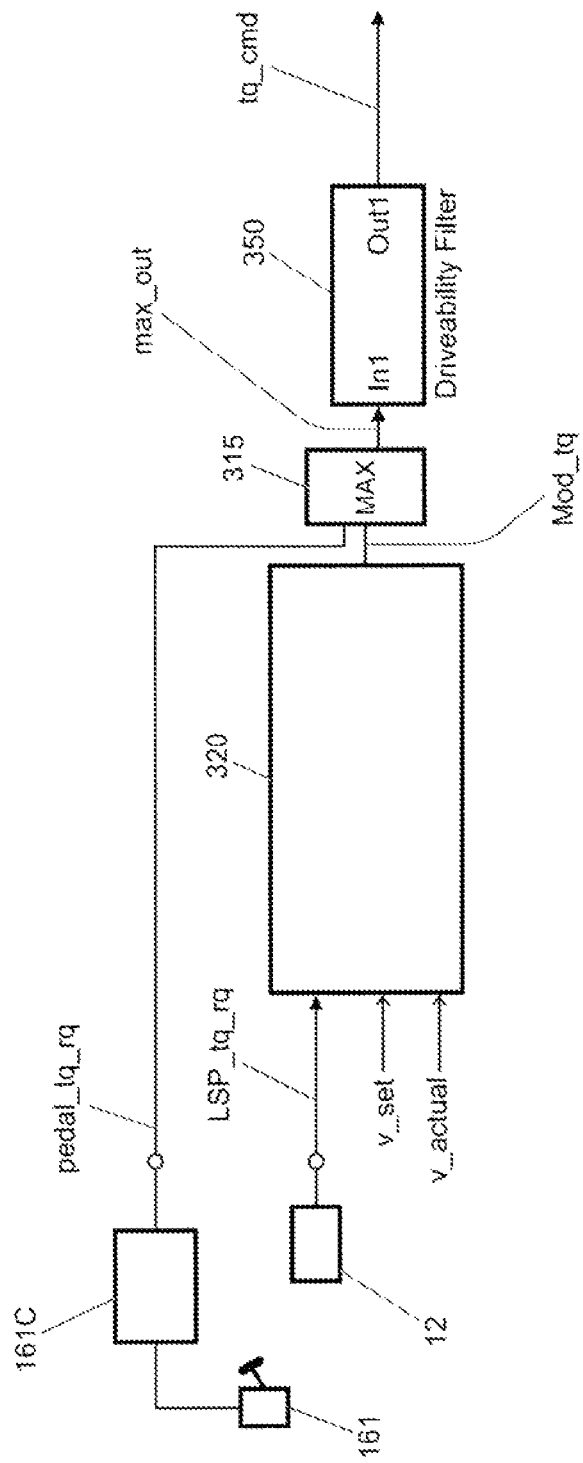
FIG. 7 shows a portion of a vehicle speed control system according to an embodiment of the present invention.

FIG. 7 illustrates implementation of powertrain torque control in the vehicle 100 of FIG. 1. As can be seen from FIG. 7 an accelerator pedal controller 161C receives an input signal from accelerator pedal 161. The signal corresponds to pedal position and in response to this signet the pedal controller 161C determines the amount of torque that the powertrain 128 should be commanded to develop. Signal pedal_tq_rq corresponding to this amount of torque is then output to a max_pass function block 315. In some embodiments, powertrain controller 11 may be involved in determining the value of pedal_tq_rq in response to a value of pedal position provided by the pedal controller 161C.

When the LSP control system 12 is active the LSP control system 12 determines an amount of torque LSP_tq_rq that is to be developed by the powertrain 129. The value LSP_tq_rq generated by the LSP control system 12 is supplied to a modifier function block 320 that provides an output torque value mod_tq to max_pass function block 315.

The max_pass function block 315 outputs to a driveability filter 350 a signal max_out corresponding to signal LSP_tq_rq or pedal_tq_rq in dependence on which signal has the higher value. The signal having the higher value is output to the driveability filter 350. The durability filter 350 is in the form of a low pass filter and generates an output signal tq_cmd corresponding to the actual amount of torque that is to be developed by the powertrain 129. The driveability filter 350 is tuned to mitigate the effects of driveline shunt so as to enhance driver enjoyment of the vehicle 100. In the present embodiment, low pass filtering of powertrain torque demand (being a value of demanded engine output shaft torque in the present embodiment) results in the generation of a filtered torque signal having a reduced rate of change of demanded torque relative to that made by the driver or LSP control system thereby reducing driveline shunt.

The driveability filter 350 provides an output tq_cmd to powertrain controller 11 corresponding to the amount of torque to be developed by the powertrain 129 of the vehicle 100. Driveability filters such as that shown in FIG. 7 are well known, and may be tuned according to the torque damping characteristics of the vehicle powertrain 129.

The modifier function block 320 receives, in addition to the signal LSP_tq_rq, a signal v_set corresponding to the user set-speed and a signal v_actual corresponding to an actual current speed of the vehicle 100. The modifier function block 320 compares the values of v_set and v_actual. If the value of v_actual exceeds that of v_set by more then a prescribed amount v_delta, the modifier function block 320 sets the value of mod_tq to a value substantially equal to the value of pedal_tq_rq when the accelerator pedal 161 is fully released. In the present embodiment, this corresponds to a value of minimum available power-train torque.

The value of mod_tq is set to this value until the amount by which v_actual exceeds v_set falls below v_delta. In the present embodiment the value of v_delta is set to substantially 2 kph although other values are also useful such as 4 kph, 6 kph or any other suitable value. In the present embodiment, when the amount by which v_actual exceeds v_set falls below v_delta the control system sets the value of mod_tq to the current, value of LSP_tq_rq. The value of mod_tq may be changed to the current value of LSP_tq_rq in a gradual manner so as to enhance vehicle composure.

It is to be understood that if the torque value applied to the driveability filter 350 were not reduced by the modifier function block 320 when v_actual exceeds v_set by a sufficient amount, the amount of time taken for vehicle speed to fall to the set-speed v_set may be significantly longer in some circumstances (particularly when travelling over terrain of relatively low drag) compared with that in the absence of the modifier function block 320. The relatively slow reduction in speed compared with operation without the LSP control system 12 may result in reduced driver confidence in the LSP control system 12.

Embodiments of the present invention have the advantage that, when the LSP control system 12 is active and a driver has intervened to increase powertrain torque above that demanded by the LSP control system 12 by depressing the accelerator pedal 161, the rate at which vehicle speed slows to the target speed may be increased following driver lift-off from the accelerator pedal 161. The rate may be increased to correspond more closely to that which would be experienced in a similar situation if the LSP control system 12 were not functioning, and a driver were to release his or her foot from the accelerator pedal 161 in order to slow the vehicle 100.

It is to be understood that if the vehicle 100 is travelling at a set-speed v_set of (say) 5 kph and with v_actual also substantially equal to 5 kph with LSP control system 12 active and in control of vehicle speed, the driver may temporarily increase vehicle speed v_actual to (say) 15 kph whilst travelling over a certain portion of the route. When the driver depresses the accelerator pedal 161 to accelerate the vehicle 100, the max_pass function block 315 allows signal pedal_tq_rq to take priority since it will exceed the LSP_tq_rq signal for a period of time.

During this period, the LSP control system 12 recognises that vehicle speed has exceeded the set-speed and may respond by reducing gradually the amount of torque demanded by the system 12. Driver override by depression of the accelerator pedal 161 prevents the LSP control system 12 from reducing the vehicle speed.

The modifier function block 320 continues to compare v_set and v_actual. As soon as v_actual exceeds v_set by more than 2 kph, the modifier function block 320 sets mod_tq to substantially zero.

If the driver subsequently releases the accelerator pedal 161, the value of pedal_tq_rq falls substantially to zero. Accordingly, both of signals pedal_tq_rq and mod_tq are set substantially to zero (provided the v_actual still exceeds v_set by more than v_delta) and a torque request of substantially zero is input to the filter 350.

When mod_tq is set to zero v_actual will fall in a manner in which the driver is accustomed since the value of mod_tq corresponds to a released accelerator pedal 161.

Once the value of v_delta falls below 2 kph, the modifier function block increases the value of mod_tq to become substantially equal to LSP_tq_rq so as to allow the vehicle 100 to continue travel at a speed substantially equal to v_set.

It is to be understood that the powertrain 120 may in fact by capable of developing (and develop) negative torque due to engine over-run (compression) braking. Such braking may be provided by the powertrain 129 substantially automatically due to inertia when the vehicle 100 is moving and a value of commanded torque tq_cmd of substantially zero is applied to the driveability filter.

Figure 8:
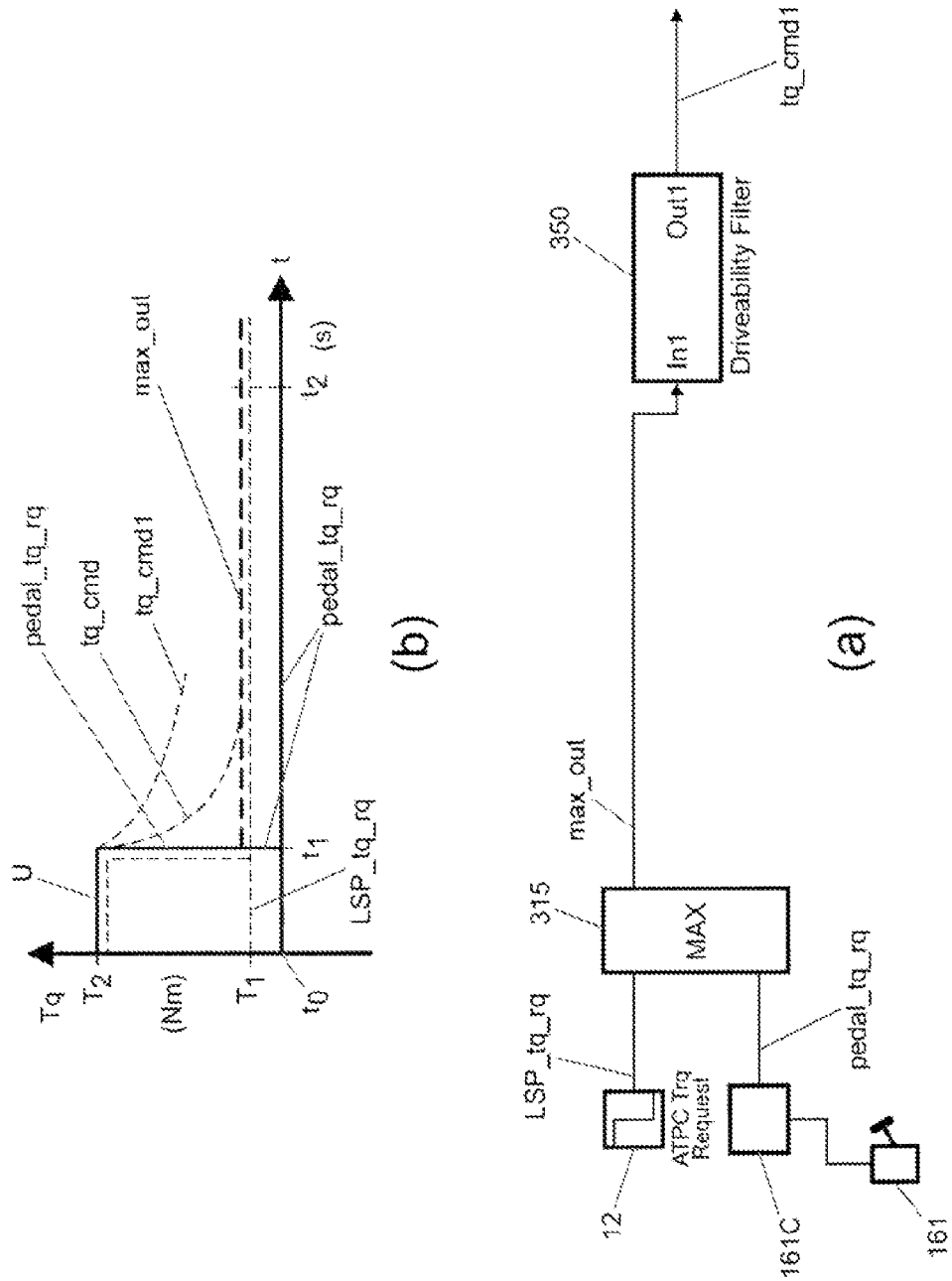
FIG. 8 shows (a) a portion of a vehicle speed control system not being a system according to an embodiment of the present invention and (b) a plot of filtered powertrain torque as a function of time following driver intervention.

By way of illustration of the importance of embodiments of the present invention, FIG. 8(a) illustrates an alternative implementation of powertrain torque control not being an implementation according to an embodiment of the present invention. In the arrangement shown, the two torque demand signals LSP_tq_rq and pedal_tq_rq described above are provided to max_pass function block 315 in a similar manner to the arrangement of FIG. 1. Signal LSP_tq_rq is generated by LSP control system 12 when the LSP control system 12 is active, whilst signal pedal_tq_rq is generated by accelerator pedal controller 161C in response to driver actuation of accelerator pedal 161. The max_pass function block 315 outputs to a driveability filter 350 a signal max_out corresponding to signal LSP_tq_rq or pedal_tq_rq in dependence on which signal has the higher value. The signal having the higher value is output to the driveability filter 350. As described above with respect to FIG. 7, the driveability filter 350 applies a low pass filter to the signal input thereto, generating an output signal tq_cmd1 corresponding to the actual amount of torque that is to be developed by the powertrain 129.

FIG. 8(b) illustrates a manner in which the amount of commanded torque tq_cmd1 varies as a function of time in one example scenario.

At time t0, the LSP control system 12 is active and generating a torque command signal LSP_tq_rq commanding generation by the vehicle powertrain of an amount of torque T1. Signal LSP_tq_rq is input to the max_pass function block 315. Also at time t0, a driver of the vehicle has depressed accelerator pedal 161 to demand torque 12 that is greater than T1. Consequently the accelerator pedal controller 161C outputs to the max_pass function block 315 signal pedal_tq_rq corresponding to a torque value 12. The max_pass function block 315 outputs the higher of these two values (i.e. the value of pedal_tq_rq, T2) to the driveability filter 350.

At time t1, the driver releases the accelerator pedal 161. The value of pedal_tq_rq therefore falls substantially to zero. The max_pass function block 315 defects that signal LSP_tq_rq now has the higher value, and therefore outputs signal LSP_tq_rq to the driveability filter 350. The value of tq_cmd1 generated by the driveability filter 250 therefore begins to fall as a function of time, as shown in FIG. 8(b) until at time t2. the value of tq_cmd1 is substantially equal to LSP_tq_rq.

By way of comparison, the value of tq_cmd that would be generated by driveability filter 350 in the embodiment illustrated in FIG. 7 in substantially the same scenario is also illustrated in FIG. 8(a). It can be seen that the value of tq_cmd falls to the value commanded by the LSP control system 12 more rapidly. Where intervention by the driver has resulted in a substantial increase in vehicle speed, the effect of the more rapid fall in the value of tq_cmd is that the vehicle speed reduces to the set-speed more rapidly.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle operable to implement a speed control function, the control system comprising:
an input for receiving an input of a target speed at which the vehicle is intended to travel;
a target speed torque determining controller module for determining an instantaneous value of a target speed torque parameter corresponding to an amount of torque that should be developed at a given position in a powertrain in order to control the vehicle to travel at the target speed;
a modifier controller module operable to receive the instantaneous value of target speed torque parameter generated by the target speed torque determining controller module and to output to a filter a value of a modified torque parameter, the value of the modified torque parameter being determined in dependence on the value of the target speed torque parameter, a current speed of the vehicle and the target speed of the vehicle,
the filter being operable to filter the value of modified torque parameter to generate a value of a filtered torque parameter,
the system being operable to command the powertrain to develop an amount of torque corresponding to the value of the filtered torque parameter.

2. A system according to claim 1 wherein the value of the modified torque parameter output by the modifier controller module is less than the value of target speed torque parameter by an amount depending on the difference between the current vehicle speed and target speed.

3. A system according to claim 1 wherein the value of the modified torque parameter output by the modifier controller module corresponds substantially to a minimum powertrain torque value if the current speed of the vehicle is greater than the target speed by more than a prescribed amount, the minimum powertrain torque value corresponding substantially to a minimum amount of torque the powertrain may develop at the given position.

4. A system according to claim 1 wherein the value of the modified torque parameter output by the modifier controller module corresponds substantially to a minimum powertrain torque value if the current speed of the vehicle is greater than the target speed by more than a prescribed amount and in addition a value of a driver-demanded torque parameter determined in response to a driver accelerator control input falls from a value corresponding to a torque value exceeding the target speed torque to a value corresponding substantially to a minimum amount of torque the powertrain may develop at the given position.

5. A system according to claim 1 wherein the modifier controller module is operable to limit a lower value of modified torque parameter output thereby to a lower saturation modified torque parameter value.

6. A system according to claim 1 comprising a user operable accelerator control for generating a value of driver demanded torque parameter, the value depending on a position of the user operable accelerator control, the system being operable to apply to the filter a selected one of the driver demanded torque parameter value and the modified torque parameter value, the selected parameter value being the value corresponding to the higher powertrain torque.

7. A system according to claim 1 wherein the filter is configured such that the filtered torque value corresponds to a low pass filtered value of the modified torque parameter.

8. A system according to claim 1 arranged to receive the input of the target speed from a user by means of a human-machine interface (HMI).

9. A vehicle comprising a control system according to claim 1.

10. A method of controlling a speed of a vehicle comprising:
receiving an input of a target speed at which the vehicle is intended to travel;
determining an instantaneous value of a target speed torque parameter corresponding to an amount of torque that should be developed at a given position in a powertrain in order to control the vehicle to travel at the target speed;

outputting to filter means a value of a modified torque parameter, the value of the modified torque parameter being determined in dependence on the value of the target speed torque parameter, a current speed of the vehicle and the target speed of the vehicle;

filtering the value of modified torque parameter to generate a value of a filtered torque parameter; and commanding the powertrain to develop an amount of torque corresponding to the value of the filtered torque parameter.

11. A method according to claim 10 comprising inputting to the filter means the value of modified torque parameter wherein the value of modified torque parameter corresponds to a value of torque that is less than the value of target speed torque by an amount depending on the difference between the current vehicle speed and target speed.

12. A method according to claim 10 comprising inputting to the filter means the value of modified torque parameter wherein the value of modified torque parameter corresponds substantially to a minimum powertrain torque value if the current speed of the vehicle is greater than the target speed by more than a prescribed amount, the minimum powertrain torque value corresponding substantially to a minimum amount of torque the powertrain may develop at the given position.

13. A carrier medium carrying computer readable code for controlling a vehicle to carry out the method of claim 10.

14. A computer program product executable on a processor so as to implement the method of claim 10.

* * * * *